United States Patent [19]
Pantermuehl et al.

[11] 3,823,608
[45] July 16, 1974

[54] TORQUE TRANSDUCER

[75] Inventors: Pontie J. Pantermuehl, Sequin; George F. Munsch, San Antonio, both of Tex.

[73] Assignee: Southern Gas Association, Dallas, Tex.

[22] Filed: Oct. 25, 1972

[21] Appl. No.: 300,438

[52] U.S. Cl. ............................................. 73/136 A
[51] Int. Cl. .............................................. G01l 3/10
[58] Field of Search ..... 73/136 A; 74/99 R; 324/34, 324/40

[56] References Cited
UNITED STATES PATENTS

| | | | |
|---|---|---|---|
| 2,260,036 | 10/1941 | Kuehni | 73/136 A |
| 2,432,900 | 12/1947 | Jacobsen | 73/136 A |
| 2,737,049 | 3/1956 | Waugh | 73/136 A |
| 2,754,683 | 7/1956 | Waugh | 73/136 A |
| 3,104,544 | 9/1963 | Guiot | 73/136 R |
| 3,176,521 | 4/1965 | Clark | 73/517 B |
| 3,205,485 | 9/1965 | Noltingk | 324/40 X |
| 3,513,711 | 5/1970 | Rogall et al. | 73/517 B |
| 3,609,527 | 9/1971 | Ellis | 324/40 |
| 3,707,091 | 12/1972 | Morris et al. | 73/517 B |

Primary Examiner—Charles A. Ruehl
Attorney, Agent, or Firm—W. F. Hyer; Marvin B. Eickenroht

[57] ABSTRACT

A torque transducer is disclosed on the slotted indicator sleeve type which converts torque on a shaft to lateral movement of such magnitude that a measurable output signal can be produced to determine the torque on a shaft. This invention is also adapted to be coupled to the shaft without altering the shaft in any way and it can be adapted to connect to the shaft without disconnecting the shaft.

16 Claims, 11 Drawing Figures

TORQUE TRANSDUCER

This invention relates to an improved torque transducer for use in measuring torque on a rotating member.

Instrumentation to measure the torque on the rotating shaft of machinery has presented a difficult problem for some time, particularly the problem of providing a suitable transducer for translating torque forces to measurable electrical or mechanical signals. Although there have been many approaches to the solution of this problem, design of a torque transducer for this purpose which successfully avoids the wear associated with either electrical or mechanical sliding contacts while also providing acceptable levels of accuracy and sensitivity has been difficult to achieve.

One general approach to solving this problem has been to provide a sleeve type transducer in which torque twist on a shaft is translated into lateral or axial movement and the extent of this movement is then measured by a magnetic pickup. Examples of this approach are U.S. Pat. No. 2,260,036, issued to H. P. Kuehni and U.S. Pat. No. 2,737,049, issued to C. C. Waugh, and the torque transducer disclosed in the NASA Tech Brief No. 66–10048, dated Feb. 1966. In each of these disclosures one or two sets of helically arranged slots or openings at an angle of 45° with respect to the axis of rotation of the sleeve are provided so that twisting of the shaft on which the sleeve is mounted causes the center of the sleeve to move laterally with respect to its ends. Either the sleeve or a projecting ring-like member mounted on or forming the center of the sleeve is constructed of a relatively high magnetic permeable material, such as soft iron, to provide low magnetic reluctance and induction coils are provided which are excited at relatively low magnetic frequencies to induce magnetic flux in the sleeve or ring-like member. The magnetic reluctance of the sleeve or ring-like member is thus relied on to provide an electrical signal proportional to the lateral movement provided by twist due to torque by detecting the change in magnetic flux that occurs in response to this movement.

However, these prior devices have several disadvantages. The use of magnetically permeable material requires very careful shielding from external fields which may cause reluctance changes the same as reluctance changes due to torque measurement. Since some of these fields may be produced by current flow or magnetic flux in the shaft on which the transducer is mounted, effective shielding may not be possible. Also, the necessity of providing low reluctance magnetic materials makes it difficult to provide a transducer construction having both good mechanical integrity for high speed operation and simultaneously the magnetic characteristics required for satisfactory electrical performances when used on relatively large diameter shafts.

Further, apparatus such as described inherently provides a relatively small signal for a given amount of torque because of the geometry or angular disposition of the slots or openings in the sleeve and the method of sensing used. Thus, they inherently have a low signal to noise ratio and flange run-out may often preclude any practical torque measurement. The magnetic permeable material may also contain material abnormalities which produce erratic and spurious signals when the sleeve is rotated. Because of the inherent low signal obtained from the prior designs discussed, it is generally necessary to "neck" the shaft down in the area where the sleeve is mounted to provide for more lateral movement of the central portion of the sleeve for a given amount of torque, thus inherently weakening the shaft. Also, since some sort of non-contacting sensing means is provided in these prior devices having closely spaced sensors or contacts for adequate sensing sensitivity, relatively large axial movements of the shaft would cause rubbing of the closely spaced members and damage to the transducer.

It is thus an object of this invention to provide an improved, torque transducer of the slotted sleeve type in which the measurable output signal which is provided in response to torque applied to a shaft is substantially greater for a given amount of applied torque than provided by prior such devices, and the noise inherent in such prior devices is reduced.

Another object of this invention is to provide such a transducer in which the sleeve or associated components need not be constructed of relatively high magnetic permeable material in order to provide a measurable electrical signal in response to torque so that noise signals inherent with use of such magnetic permeable material are substantially reduced.

Another object of this invention is to provide such a transducer in which the amount of measurable lateral movement provided in response to a given amount of torque applied to a shaft is substantially increased over that provided by prior such devices so that larger and more easily measurable signal levels are provided in response to torque on the shaft.

Another object of this invention is to provide such a transducer having non-contacting sensing means which may be closely spaced to the sleeve or an appendage thereof, for good sensitivity, but in which relatively large axial movements of the shaft do not cause contact of the closely spaced members.

Another important problem associated with measuring torque on a rotating shaft is the provision of suitable coupling of a transducer to the shaft. In prior devices, such as described, the use of the transducer required modification of the shaft (such as "neckingg" it down) or that its connection with associated objects be broken so that the transducer could be mounted on the shaft. This particularly is a problem with large shafts such as are used to couple large motors and compressors. It is thus another object of this invention to provide an improved torque transducer of the slotted sleeve type which may be used with little or no shaft modifications and in which the problems of shaft coupling inherent in prior devices are substantially reduced.

Another object of this invention is to provide a torque transducer which accomplishes the above stated objects, and which may use noncontacting sensors, in which transducer misalignment or nonlinearities are effectively cancelled, which may be easily statically calibrated, and which may be used for a wide range of torque measuring applications.

These and other objects of this invention, which will become apparent upon consideration of the description herein and appended claims and drawings, are accomplished in the preferred embodiments of this invention disclosed by providing a slotted sleeve type torque transducer such as provided by the prior art discussed, but in which the appendages of the sleeve thereof are constructed of a relatively low magnetic permeable material, such as aluminum. The sleeve may be constructed of steel or of aluminum. Thus, noise inherent in the prior art magnetic device noted and from material defects is substantially reduced. A non-contacting sensing means is mounted adjacent to the sleeve and responds to lateral movement (or axial movement along the axis of rotation of the shaft) of a portion of the sleeve in response to torque to provide an electrical signal proportional to torque. In one form of this invention, this sensing means uses eddy current techniques and is provided by a plurality of coils would on ferrite cores and stationarily mounted. The sleeve includes a conductive, nonmagnetic ring about its central portion and conductive, nonmagnetic rings about or adjacent to its ends which are connected to the shaft. The area between the end rings and the central ring is relieved so that the central ring moves axially with respect to the ends in response to shaft twist due to torque. Coils are mounted between each of the end rings and the central ring and are driven by an electrical signal of sufficient frequency and magnitude to induce eddy currents in the adjacent rings. The coils are preferably bridged together so that when no torque is applied to the shaft a balanced output signal is provided. When the central ring moves axially with respect to the end rings, this balance is upset and a signal is provided proportional to the axial movement.

In another form of the nonmagnetic, noncontacting, sensing means of this invention, stationarily mounted capacitor plates or elements are provided between the rotating end rings and the central ring, to form capacitors with these elements and the rings. The stationary elements are given by an electrical signal and the end and central rings grounded through the shaft. Axial movement of the central ring with respect to the end rings causes measurable changes in the capacitances of the capacitors formed which changes can be read out as torque. Use of capacitive sensing further reduces background noise that may be otherwise produced by residual magnetism in the rotating shaft. Use of either the eddy current or capacitive sensing means eliminates the requirement of a magnetic path through the rotating assembly and circumvents problems due to magnetic inhomogeniety in the transducer or shaft material, external electrical and magnetic interference fields, and poor signal strength.

Also, a further aspect of this invention is the improvement in sleeve construction which provides for mechanical amplification between the magnitude of the twist applied to the shaft and the axial movement of the central ring. Intermediate each of the ends of the sleeve and the central portion a plurality of slotted openings are provided which are preferably of a stepped helix configuration and these openings form a plurality of linkage arms connecting the central portion to each end. The slotted opening configuration, and thus the linkage arm configuration and geometry, between one end and the central portion is the mirror image of the openings and linkage arms between the other end and the central portion. Mechanical amplification is provided by this configuration by reducing the slot angle or angle of pivoting of the linkage arms provided between the central portion of the sleeve and the end portions to substantially less than 45°. For example, with such an angle of 14°, approximately four times the amount of axial movement of the central ring over the 45° configuration of the prior art can be provided, resulting in a substantially larger output signal for a given amount of applied torque. Thus, not only is noise reduced, but signal strength is increased for a given amount of torque to be measured.

It is preferred that the linkage arms between the ends of the sleeve and the central portion be provided by slotted openings which form a stepped helix so that the present sleeve is particularly suited to be split into two identical semi-cylindrical sections which may be screwed together or otherwise secured together about a shaft. Also, because of the higher sensitivity of the torque transducer of this invention due to the improved signal to noise ratio, the shaft generally does not need to be necked down in the area of the sleeve connection.

Referring now to the drawings, wherein are illustrated preferred embodiments of this invention and in which like reference numerals are used throughout to designate like parts, FIG. 1 is a view in elevation showing the preferred form of transducer of this invention mounted about a rotatable shaft, with a portion cut away to show the transducer sleeve;

FIG. 8 is a diagramatic view of one form of connector for connecting the transducer of FIG. 1 to a shaft;

FIG. 9 is an elevational view of a collet for use with the connector of FIG. 8;

FIG. 10 is a diagramatic view of another form of connector for connecting the transducer of FIG. 1 to a shaft;

Figure 1:
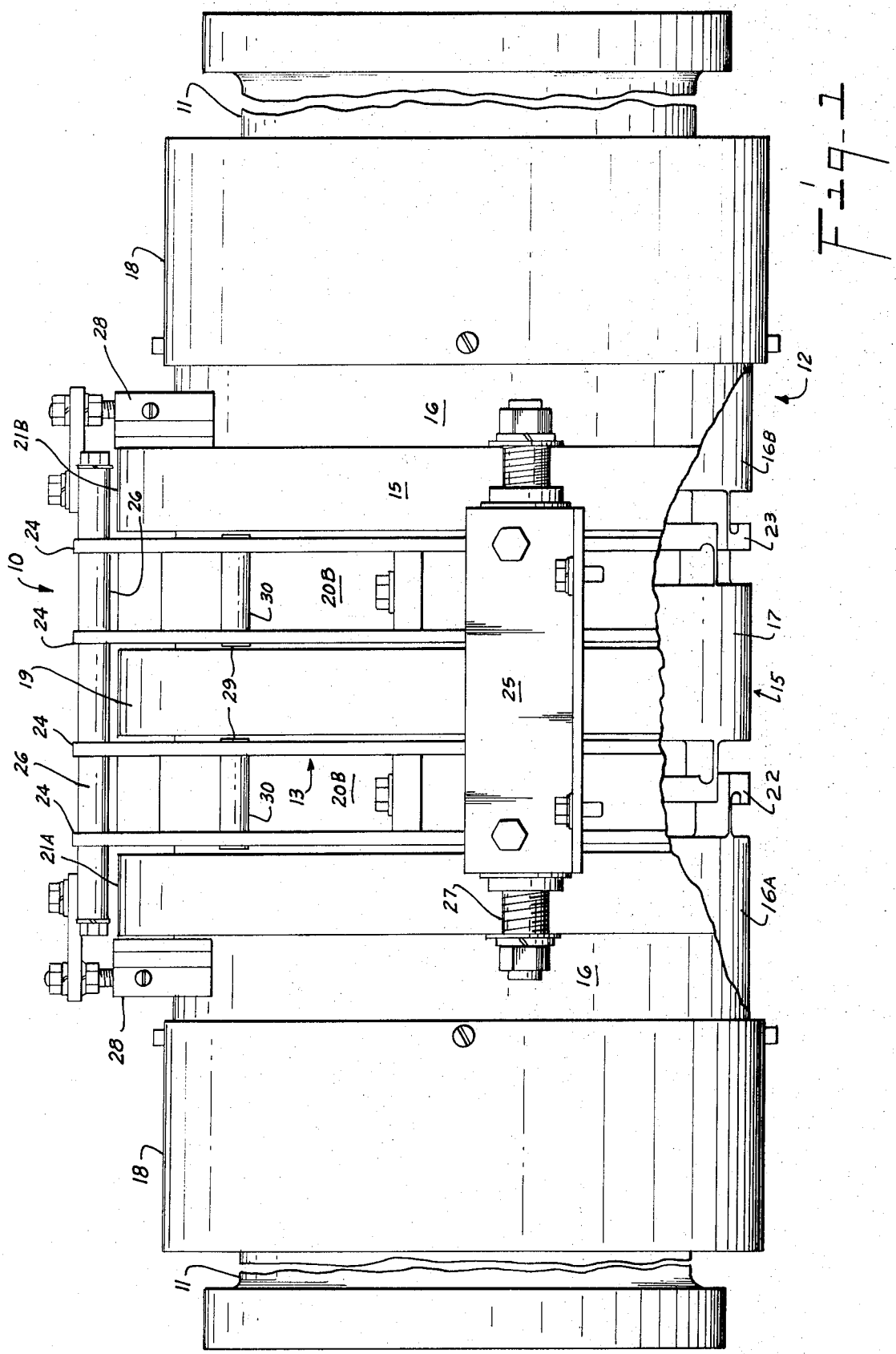
Figure 2:
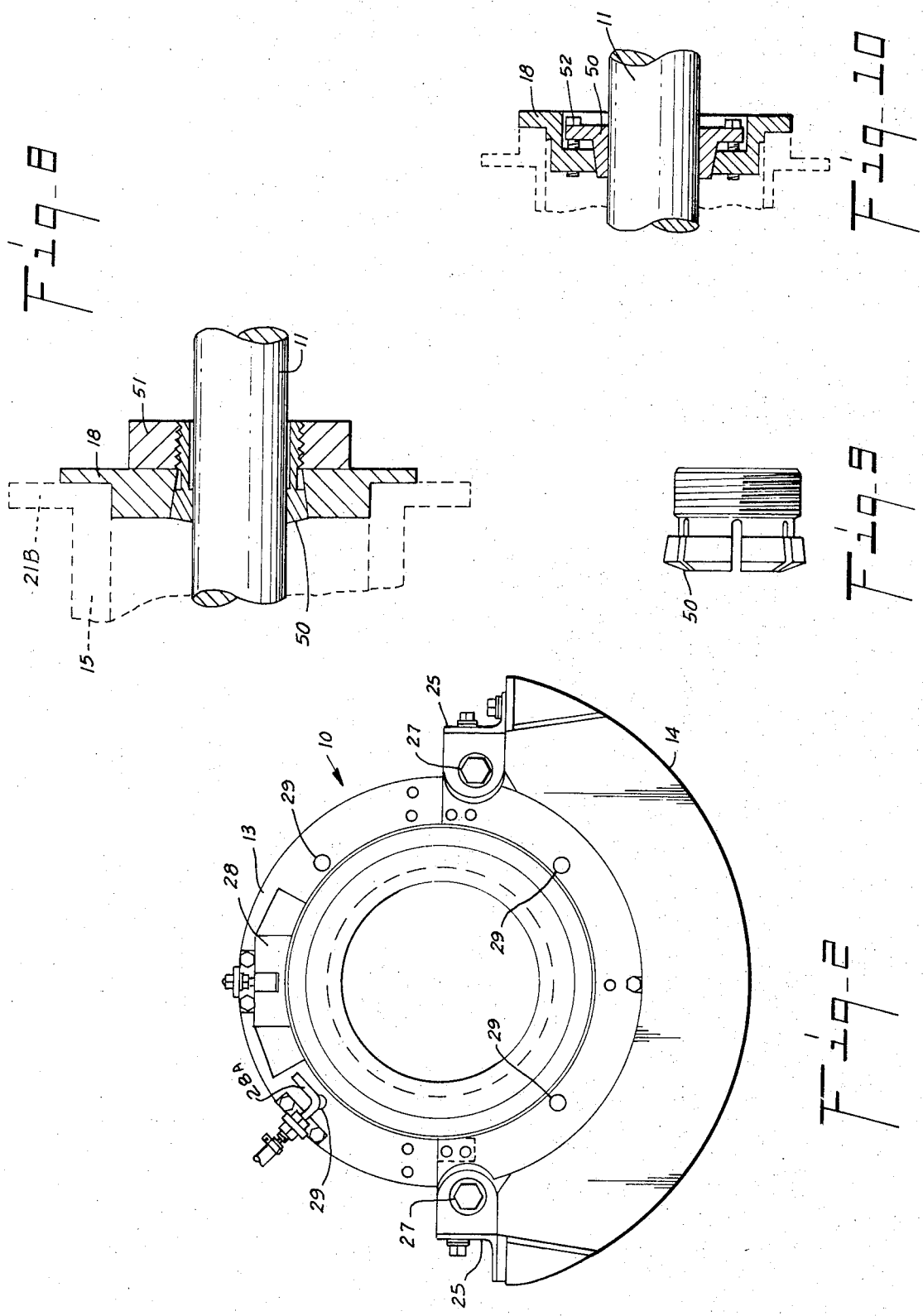
FIG. 2 is an end view of the FIG. 1 embodiment without the shaft being shown.

Referring now to FIGS. 1–4, a torque transducer 10 is illustrated as mounted on a rotatable shaft 11. Transducer 10 includes a rotating portion 12 which is secured to shaft 11 and rotates therewith, and a stationary sensing portion 13 which is mounted on a stationary platform or frame 14 (not shown in FIG. 1), and which is mounted about and adjacent to rotating portion 12. Rotating portion 12 of transducer 10 includes an internal cylindrical indicating sleeve 15 which serves to translate torque twist of shaft 11 between the ends 16A and 16B of sleeve 15 to lateral or axial movement (along the axis of rotation of shaft 11) of a central portion 17 of sleeve 15 (see FIG. 3). A central conductive ring 19 is mounted on and about central portion 17 of sleeve 15 and is fixed for movement with central portion 17. The ends 16A and 16B of sleeve 15 are secured to shaft 11 by outer clamping rings 18 at each such end. Two relatively short cylindrical sleeve members 20 are provided and each are mounted about sleeve 15 on each side of central portion 17. Sleeves 20 include a relatively thick section 20A extending about ends 16A and 16B and having an inside diameter so that they fit tightly about ends 16A and 16B. Sleeves 20 also include a relatively thin section 20B extending from ends 16 toward ring 19 and stopping just short of ring 19, and having an inside diameter substantially larger than the diameter of sleeve 15 so that a clearance is provided between sections 20B and sleeve 15. Section 20B acts as an electrical shield between the shaft and the sensing means so that electric fields are not coupled between the shaft and sensing means. An end ring 21A and an identical end ring 21B are mounted on and about sections 20A of sleeves 20 and are fixed to rotate with sleeve 15. As to be described in detail, the portion of sleeve 15 between end rings 21A and 21B and central ring 19, and adjacent portion 20B of sleeve 20, is relieved to provide a plurality of linkage arms 22 connected between end 16A of sleeve 15, and central portion 17, and linkage arms 23 between the other end 16B and central portion 17.

Figure 7:
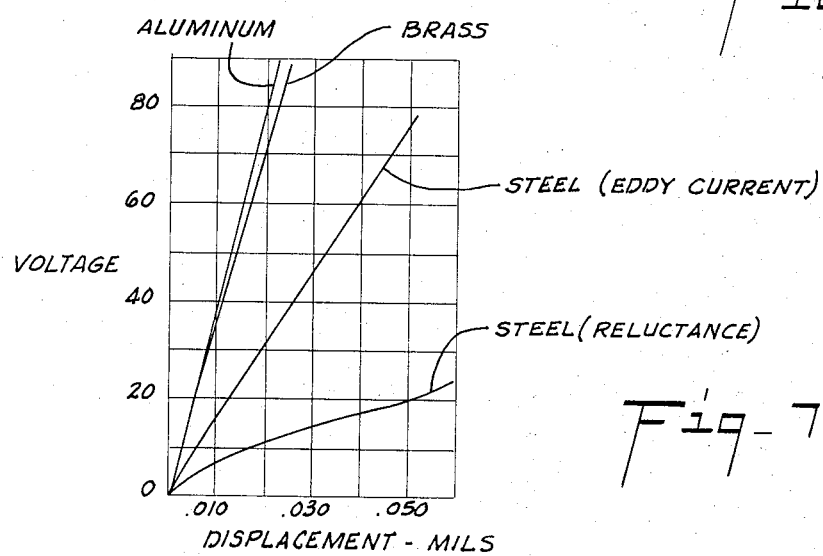
FIG. 7 is a graph showing the relationship between the output voltage of the circuit of FIG. 5 and the amount of axial diaplacement provided by utilizing different materials for the transducer sleeve.

In accordance with this invention, rings 19, 21A and 21B, sleeves 20 and flanges 18 are constructed from relatively low magnetic permeability material, such as aluminum, brass or a relatively high magnetic reluctance steel. Aluminum is preferred for this material as it has the lowest magnetic reluctance and is the most sensitive of the materials noted for eddy current measurements (see FIG. 7). Also, the use of aluminum as a flange material eliminates the problem of abnormalities found in magnetic permeable iron. Sleeve 15 may be constructed of aluminum or steel, however, stress-proof steel has been found to be perferable because of relatively low internal creep and mechanical strength. FIG. 7 illustrates the relative signal strength provided by sleeves constructed of different materials, and the improvement provided by using eddy current sensing techniques with a steel sleeve instead of magnetic reluctance sensing.

Stationary sensing portion or carriage 13 includes a plurality of spaced rings 24 which mount on angle mounting brackets 25 on opposite sides of transducer 10 and brackets 25 are in turn mounted on and secured to frame 14. Spaced apart rings 24 are arranged in pairs of opposite sides of central ring 19, and each pair of rings 24 extend into and about the space between end rings 21A and 21B and central ring 19 but are spaced from and do not contact either end rings 21A or 21B, or central ring 19, or sleeve members 20B. Suitable insulated spacers 26 are provided to space each of the respective pairs of rings 24 a fixed distance from each other less than the distance between the rings mounted on sleeve 15. Means, such as adjustable bolts 27 on which rings 24 are mounted on flanges 25 are provided to permit alignment of the spacing between the rings of each of portion 12 and 13. Also, adjustable bearing blocks 28 made of Teflon or other material of low coefficient of friction are provided between stationary portion 13 and sleeve 15 and end rings 21A and 21B and function as a follower to prevent contact between the coils 30 to be described, contained in the carriage assembly and the rotating rings 19 and 21A and 21B during large axial excursions of shaft 11.

A moderate amount of axial movement can be physically accommodated by the size of the gaps between the coil ends and the rotating flanges. However, in applications where an intermediate shaft between two large independently mounted machines is to be instrumented, the amount of axial movement anticipated during warm-up, or other particular operating circumstances generally far exceeds the dimension which can be provided by gaps of a practical size. The follower arangement on the carriage is utilized to cause the whole carriage to follow axial movement of the shaft to prevent possible damage to the unit arising from contact between the stationary coil faces and the rotating rings when the shaft axial movement exceeds the nominal gap dimension and provides the necessary coarse adjustment of the lateral location of this coil assembly as dictated by gross shaft movement. Thus, the gaps between the coil ends and the rotating flanges can be kept relatively small to assure good sensitivity of the transducer. By adjustment of bolts 27 and positioning of blocks 28 the respective pair of rings 24 can be aligned equidistant from the rings 19, 21A and 21B adjacent to them. Suitable means for lubricating the bearings 28 with oil such as a spout 28A is also provided.

Also mounted between each respective pair of rings 24 are a plurality of ferritic cores 29 on which are wound induction coils 30. In the embodiment illustrated four such cores and coils are provided between each pair of spaced rings 24, and the cores and coils are mounted 90° circumferentially from each other about shaft 11. When no torque is applied to shaft 11, cores 29 are spaced equidistant from each of rings 19 and 21A, and 19 and 21B, so that gaps G1, G2, G3 and G4 shown in FIG. 4 between cores 29 and rings 19, 21A and 21B are equal. Coils 30 are preferably excited by alternating current electrical signals above the usual magnetic frequencies to induce eddy currents in rings 19, 21A and 21B and sleeves 20 and 15. For example, an excitation frequency of 25 KHz has been found to be suitable, and the impedance of the associated electrical sensing circuit is affected by eddy current induced in the transducer. As illustrated in FIG. 5 in which the numeral 30A is used to represent the drive and read out electronics associated with coils 30, and M, a meter scaled to read out relative torque, coils 30 may be connected together to form a balanced bridge circuit when gaps G1, G2, G3 and G4 are equal. The balanced bridge connections of the sensing coils provides reduction of erroneous output due to motion of the entire rotating transducer. However, when shaft 11 twists between end flanges 18 due to torque, for example, so that a point A in FIG. 4 moves circumferentially with respect to a point B in FIG. 4, central ring 19 moves axially toward or away from point A and end rings 21A and 21B. The direction of this movement depends on the direction of twist or shaft 11 and the movement of ring 19 changes the relative width of gaps G2 and G3 with respect to gaps G1 and G4, which remain constant. When this occurs, the bridge formed by coils 30 becomes unbalanced in one direction and the resulting electrical signal $E_o$ at the output of electronics 30A is proportional to the change in spacing between ring 19 and cores 29, and also the amount of torque twist required to cause this change in spacing.

Figure 3:
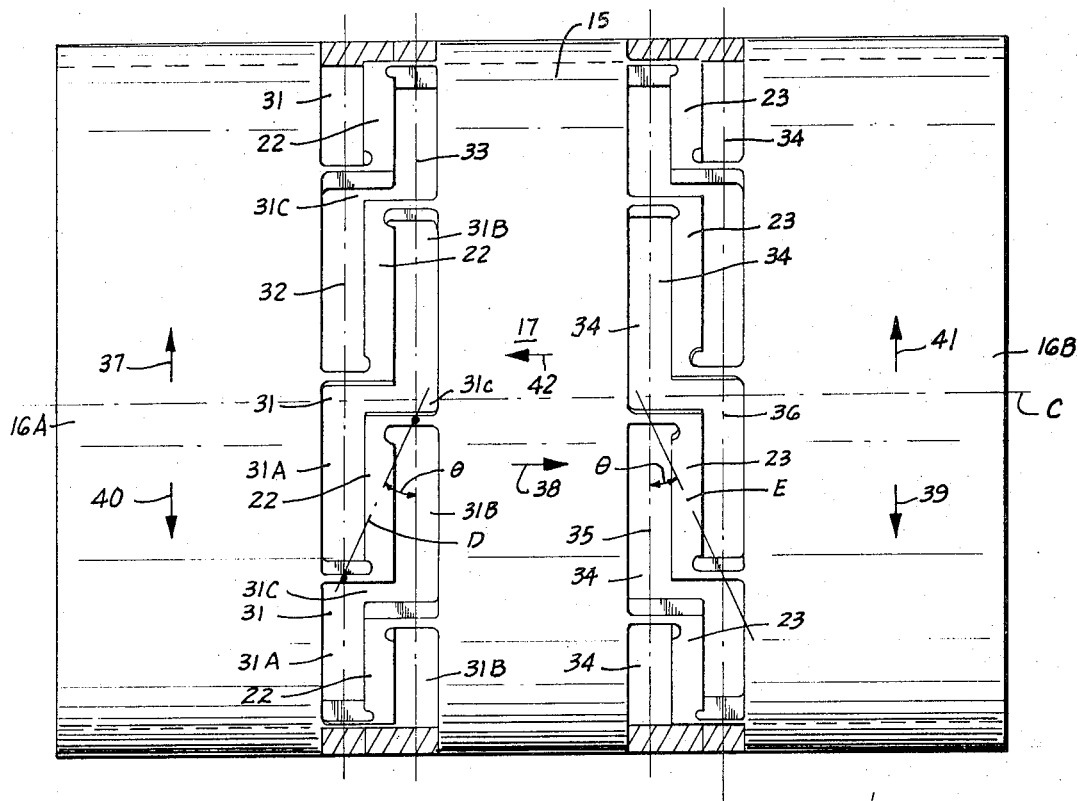
FIG. 3 is a view in elevation of the preferred form of transducer sleeve used in the transducer of FIG. 1.

An important aspect of this invention is that mechanical amplification is provided between the circumferential movement of end rings 21A and 21B with respect to central ring 19, and the axial movement of central ring 19 with respect to the end rings. Referring to FIG. 3, a slot-linkage configuration is illustrated which provides such mechanical amplification. As shown therein, linkage arms 22 between end 16A and central portion 17 are preferably provided by stepped helical slots 31 extending about the circumference of sleeve 15. These slots include first circumferentially extending portions 31A which extend along a line 32 perpendicular to the axis C of rotation of shaft 11, and adjacent to end portion 16A, and second circumferentially extending portions 31B which extend along a line 33 also perpendicular to axis C but adjacent central portion 17. Slot portions 31A and 31B are preferably of equal length and are connected by axially extending slot portions 31C. Linkage arms 22 respond to twisting movement of end 16A to pivot along a line D which has an angle $\theta$ with respect to line 33 of substantially less than 45°.

Linkage arms 23 between end 16B and central portion 17 are a minor image of linkage arms 22 and are formed by stepped helical slotted openings 34 extending about sleeve 15 and of identical configuration as openings 31 described. Twisting of end portion 16B causes linkage arms 23 to pivot along a line E of the same angle $\theta$ with respect to lines 35 and 36 perpendicular to axis C. However, if end 16A is twisted in the direction of an imaginary arrow 37, angle $\theta$ between line D and line 33 increases and central portion 17 moves in the direction of an imaginary arrow 38. At the same time, end 16B is twisted in the direction of an imaginary arrow 39, then linkage arms 23 pivot along a line E so that angle $\theta$ between line 35 and line E is decreased permitting movement of central portion 17 in the direction of arrow 38. When the direction of twist of ends 16A and 16B is in the direction of imaginary arrows 40 and 41, respectively, then angle $\theta$ between line E and line 35 increases and angle $\theta$ between line D and line 33 decreases causing central portion 17 to move in the direction of an imaginary arrow 42.

Figure 4:
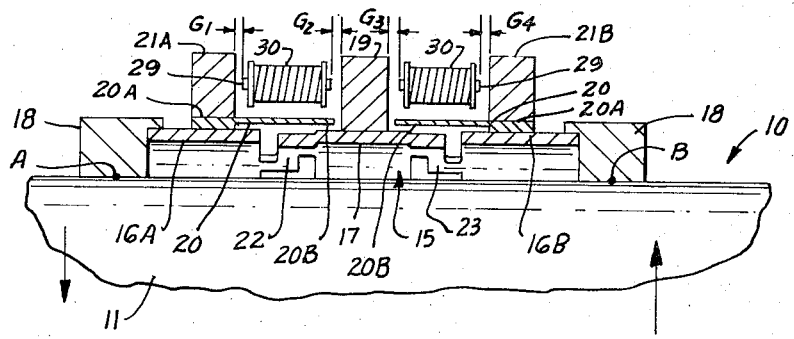
FIG. 4 is a partially diagramatic and partially sectional view taken along the axis of rotation of the shaft of the transducer of FIG. 1, showing the internal construction of the transducer and illustrating the eddy current sensing means provided by this invention.
Figure 5:
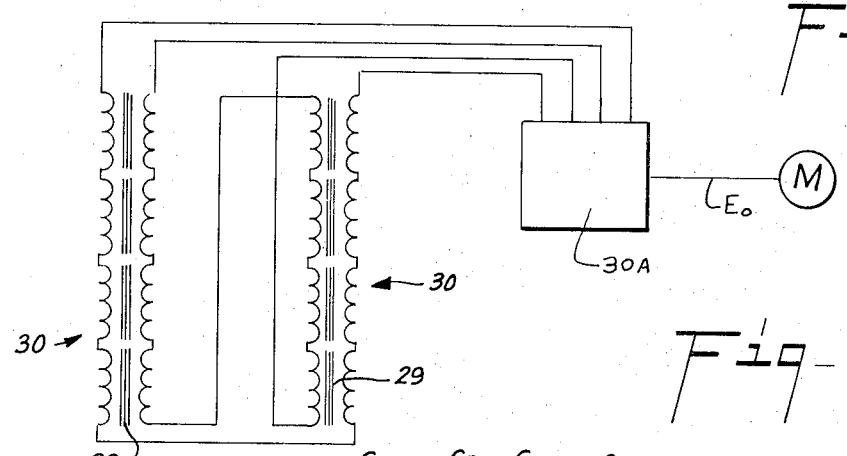
FIG. 5 is a circuit diagram of the sensing means of FIG. 4.

The following set of formulas have been derived for predicting the amount of axial deflection $M_2$ of central ring 19 for a given amount of torque T applied to shaft 11, and as a function of the angle $\theta$. Thus, $$(M_1 + M_3) = (TD_2 l_1 K/J) \quad (1)$$

where, $M_1$ = maximum angular twist of sleeve 15 (at mean diameter) in one radial direction $M_3$ = maximum angular twist of sleeve 15 (at mean diameter) in the opposite radial direction T = applied torque $D_2$ = Mean Sleeve Diameter $l_1$ = free shaft length between ends 16 (i.e., the distance between points A and B in FIG. 4)

J = polar amount of inertia of shaft cross section

K = a constant ½G, where G is the torsional moments of elasticity of the shaft (i.e., $11 \times 10^6$ psi for steel)

If the axial deflections of center ring 19 are $M_2$, then $$M_2 = (M_1/\tan \theta) \quad (2)$$

and $$M_2 = (M_3/\tan \theta) \quad (3)$$

Then, substituting equation (2) and (3) into equation (1), then with $\theta = 45°$; (i.e., $M_1 = M_2 = M_3$)

$$M_2 = (TD_2 l_1 K/J) \quad (4)$$

However, with $\theta = 14°$, then $$M_2 = (4TD_2 l_1 K/J) \quad (5)$$

or four times the value of $M_2$ from equation (4). Further, if $$\theta = 26° 34', \text{ then}$$

$$M_2 = 2TD_2 l_1 K \quad (6)$$

or two times the value of $M_2$ from equation (4).

In actual practice of this invention, a sleeve 15 was constructed with an angle $\theta$ of 20° and with an angle $\theta$ of 45° and the deflection $M_2$ was both calculated and measured at different applied torques. Using an angle $\theta$ of 20° in formulas (1) through (3), $M_2$ is calculated by the above equations to be approximately 2.8 times the value of $M_2$ with $\theta = 45°$. Tables I and II below the relationship between the calculated and measured value of $M_2$ with $\theta = 20°$ and $\theta = 45°$ in a sleeve constructed in accordance with this invention, but in which the 45° sleeve was used on a necked down shaft (one inch shaft necked down to one-half inch) and the 20° sleeve was used on a full one inch shaft.

TABLE I (45° slots)

| Torque in-lbs | Calculated M₂ (inch) | Measured M₂ (inch) |
|---|---|---|
| 200 | 0.0002 | 0.0003 |
| 600 | 0.0006 | 0.0006 |
| 1200 | 0.0012 | 0.0011 |

TABLE II (20° slots)

| Torque in-lbs | Calculated M₂ (inch) | Measured M₂ (inch) |
|---|---|---|
| 1200 | 0.00245 | 0.0025 |
| 1800 | 0.00367 | 0.0036 |
| 2400 | 0.00489 | 0.0047 |

Even without the necked down shaft in the 20° case, in all cases the calculated and measured values would be more than twice the value of $M_2$ with $\theta = 45°$. Thus, it is evident that with the angle $\theta$ substantially less than 45°, and preferably from about 14° to about 30°, that the axial deflection for a given amount of applied torque can be increased from about 2 to about 4 or more times that of the prior art configurations, thus providing for greatly increased measurable signal strengths from the transducer.

Figure 6:
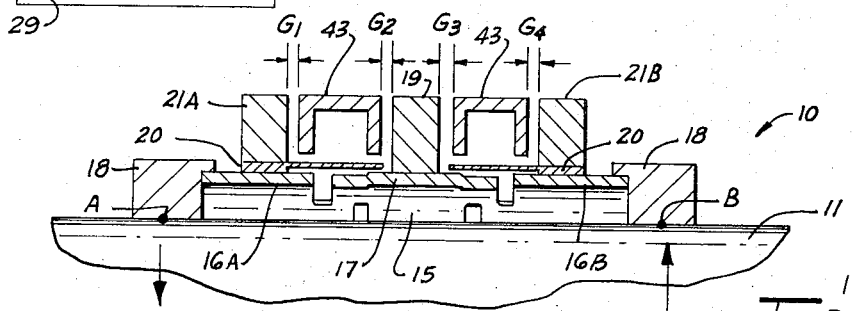
FIG. 6 is a partially diagramatic and partially sectional view taken along the axis of rotation of the shaft of the transducer of FIG. 1, showing the internal construction of the transducer and illustrating the capacitive sensing means provided by the invention.

Referring now to FIG. 6, an alternate form of sensing means is illustrated in which coils 30 are replaced by a plurality of capacitive elements 43 which are mounted in between and spaced from central ring 19 and end rings 21A and 21B. In FIG. 6, mounting apparatus such as shown in FIG. 1 with respect to the eddy current sensing means is not shown, however, any suitable mounting apparatus may be provided and, of course, plates 43 should be stationarily mounted. As with the embodiment described in FIG. 4, gaps G1 and G4 are provided between plates 43 and rings 21A and 21B respectively, and gaps G2 and G3 are provided between plated 43 and central ring 19. In this embodiment, central ring 19 and end rings 21A and 21B also form capacitor plates that are grounded through shaft 11 and an electrical signal is applied by a signal generator (not shown) to each of plates 43 so that elements 43 and the adjacent rings form capacitances in the circuit of the signal generator. The capacitances formed may also be bridged so that if gaps G1, G2, G3 and G4 are equal, a balanced or no signal output is provided. However, when central ring 19 moves axially with respect to end rings 21A and 21B, thus increasing one of gaps G2 and G3 and decreasing the other while gaps G1 and G4 remain constant, then the capacitance bridge formed is unbalanced and a signal proportional to applied torque is provided. By use of the capacitive type sensing means susceptibility to stray magnetic fields is avoided and by use of a suitable filtering network noise, which is the result of flange or bearing runout, can be substantially reduced to some value well below that of the signal received from axial movement of central ring 19. Also, the use of capacitive sensing is particularly important where transient torques are measured which are otherwise difficult to pick out from rotational noise without reducing the transient response.

In actual practice of this invention, by adjustment of the electrical characteristics of coils 30 and relative positions of these coils with respect to rings 21A, 21B and 19, the value of output signal $E_o$ due to axial translation of these three rings could be kept below 1 mV per mil, as compared to a reference output signal value of 1 volt per mil of central ring 19 movement. Under these same conditions, no output would be detected from movement of the three sleeve rings in the direction perpendicular to the axis of the coils. Also, because of the reliance on sensing the lateral positions of central ring 19 with respect to end rings 21A and 21B to provide an indication of torque, the effects of unrelated shaft motions, such as due to bearing movement which would otherwise tend to interfere with the torque movement, are effectively cancelled out. Also, the use of "mirror image" slots in sleeve 15 adds greatly to the linearity of the torque measurement as illustrated in FIG. 7 since nonlinearity in one set of slots is compensated for by nonlinearity of the opposite sign in the other set of slots. However, inaccuracies in the location and orientation of coils 30 may result in loss of cancellation of error signals resulting from movement of the entire transducer. The magnitude of the error signals is related to the alignment distance error by approximately the same transfer function as the wanted signal function, i.e., in the case cited above, 1 volt per mil. Thus, with a transducer designed for 15 mils center flange displacement for 100 percent torque, the cumulative coil placement and flange run-out error must be less than 0.15 mils if they are to contribute no more than 1 percent error signal. Further measurements indicated that the system sensitivity is directly related to coil pole surface area, and that increasing this parameter also reduced the effects of small magnetic and conductive anomalies in the surfaces of the flanges. For slow response requirements, the rotational noise can be filtered out of the running signal, leaving only the problem of defining the zero load reference point, if it is not possible to rotate the torque meter in place under no load condition.

Also, an important feature of this invention is that because of the sensing techniques used, torque measurement accuracy is independent of shaft size and based on the yield strength of the material used. Thus, a set of transducers can be readily provided for measuring torque on different size shafts of the same material.

FIGS. 8 through 10 illustrate various apparatus for coupling a transducer such as described in FIGS. 1 through 4 to a shaft, it being understood that a number of different mechanical designs could be shown for this purpose. In arriving at suitable designs of the transducer or the means for its attachment, the following factors are of importance:

1. The shaft should be left intact. No slots or holes should be cut into the shaft to which the sleeve mounts.

2. The shaft attachment should be as light as possible and have as few components as possible. Balancing problems could be introduced by massive, complex shaft attachments. The transducer and its coupling should be symmetrical to avoid balancing problems.

3. The shaft attachment should provide a minimum of sleeve flange run-out.

4. If possible, the shaft attachment method should provide for a split configuration corresponding to the single piece in order to clamp to shafts which are inaccessible by any other means.

In FIG. 8, for example, a collet 50, shown in detail in FIG. 9, having a tapered end and a threaded end may be wedged between outer flange 18 and shaft 11. A nut 51 may be then screwed onto the threaded portion of collet 50 and tightened until collet 50 is tightly wedged between shaft 11 and flange 18 and secures the ends of transducer 10 to the shaft. As noted in FIG. 9, the tapered end of collet 50 may be slotted to permit it to crimp the outer surface of the shaft.

In FIG. 10, a similar arrangement is provided except that collet 50 is not threaded but is wedged between flange 18 and shaft 11 by the tightening of a bolt 52 which passes through collet 50 and into flange 18. Both of the arrangements described are suitable for providing simple and quick attachment of transducer 10 to a rotatable shaft, however, the design of FIG. 10 is preferred as it provides for less flange run-out.

Figure 11:
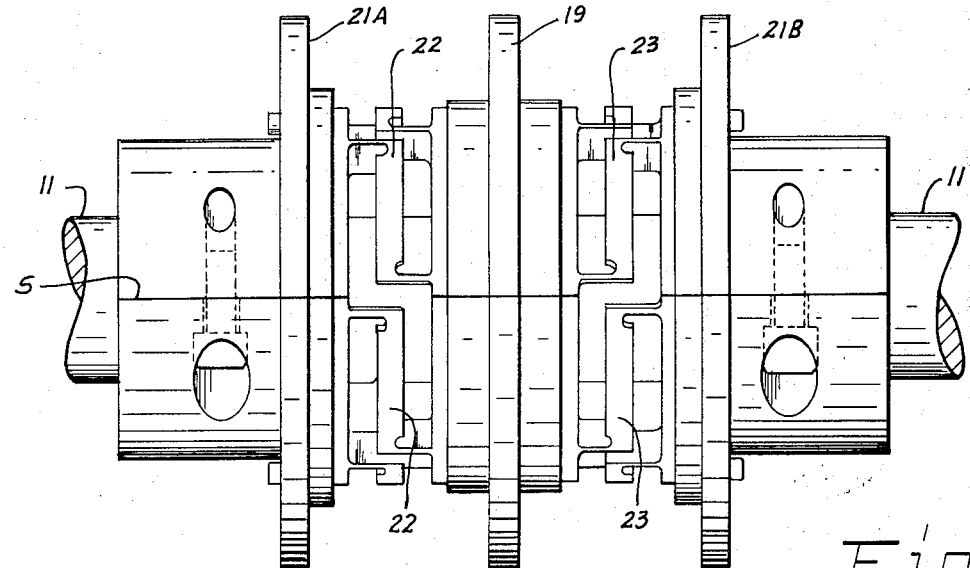
FIG. 11 is an elevational view of a preferred form of split transducer of this invention.

In many instances, it is desirable that a transducer such as described in this specification be attached or mounted on a shaft without breaking the shaft connection. This is particularly true in large diameter shafts employed with heavy machinery. The transducer of the present invention is particularly suitable for being split into identical semicylindrical sections which may be placed about the shaft and bolted thereon. The stepped helix arrangement of slotted openings that form linkage arms 22 and 23 are particularly suited for this because sleeve 15 can be split along the axially extending portion of the stepped helixes without interfering with the operation of the sleeve. In this manner, none of the linkage arms formed by the slotted openings need to be split which would be the case if the prior art helical arrangements would be used. As illustrated in FIG. 11, transducer 10 would be split along a line S parallel to the axis of rotation of shaft 11, and the slots can be arranged around the indicator sleeve so that axially extending slots 180° apart are provided. Suitable bolts and threaded openings are provided in the respective half sections for securing the transducer parts together.

The split transducer of FIG. 11 is preferably comprised of a high stress steel indicator sleeve for minimum creep and aluminum sleeve rings for maximum eddy current sensitivity.

In order to facilitate installation of the sensing coils 30 in the split sleeve design of FIG. 11, two ferrite cylinders may also be split, and the four segments of these cylinders individually wound to form four coils which would encircle the split sleeve. These four coils may then be connected in a bridge circuit, as has been done previously with small individual coils 30. Of course, any suitable design of the sensing apparatus which permits it to be mounted about split transducer 10 without need for breaking the shaft connection would be compatible with the split sleeve design of FIG. 11.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A torque transducer for use in measuring torque on a rotating member, comprising, in combination: an indicator sleeve adapted to be mounted about such a rotating member and be connected adjacent its ends to said member for rotation therewith, said sleeve including a central portion adapted to be free of said rotating member for movement relative thereto, and being relieved between each of said ends and said central portion to permit axial movement of said central portion with respect to said ends in response to twisting of said member due to torque; a conductive ring-like member of relatively low magnetic permeability mounted on said central portion for movement therewith; and non-contacting sensing means adapted to be mounted adjacent to and spaced from said ring-like member and adapted to be electrically coupled to ring-like member to provide an electrical signal that is responsive to relative axial movement between said ring-like member and said ends of said sleeve and thus the torque on said rotating member, said sleeve being relieved between each of its ends and said central portion by a plurality of helically arranged openings of like configuration, each of said openings having geometry such that significant mechanical amplification is provided between the twisting movement of said rotating member in response to torque and the axial movement of said flange in response to said twisting movement.

2. The transducer of claim 1 wherein said sensing means includes inductive elements for inducing and responding to eddy currents in said ring-like member to provide said electrical signal.

3. The transducer of claim 1 wherein said sensing means includes capacitive elements adapted to be mounted to form a capacitor with said ring-like member, and wherein said electrical signal is responsive to the capacitance of said capacitor.

4. The transducer of claim 1 wherein said ring-like member is constructed of relatively low magnetic pemeable material selected from the group consisting of aluminum, brass or steel.

5. The transducer of claim 1 wherein said ring-like member is constructed of aluminum.

6. The transducer of claim 1 wherein said helically arranged openings form a plurality of linkage arms connected between adjacent one of the ends of said sleeve and said central portion, each of said linkage arms responding to twisting of said rotating member to pivot along a line at an angle substantially less than 45° with respect to the axis of rotation of said rotating member.

7. The transducer of claim 1 wherein said sleeve is split longitudinally to provide two substantially identical sections for mounting on said rotating member, and further including means for connecting said sections together about said member.

8. The transducer of claim 1 further including second conductive ring-like members of low magnetic permeability, each mounted on said sleeve about one of its ends, and adapted to be electrically coupled with said sensing means so that said electrical signal is responsive to relative axial movement of said first mentioned ring-like member and said second ring-like members.

9. The transducer of claim 1 wherein axial movement of said rotating member causes movement of said ring-like member towards said non-contacting sensing means, and further including follower means responsive to axial movement of the rotating member to cause said sensing means to move in a manner to maintain at least a minimum spacing between said ring-like member and said sensing means during relatively large axial movements of the rotating member, while preventing contact between said ring-like member and said sensing means.

10. A torque transducer for use in measuring torque on a rotating member, comprising, in combination: a sleeve adapted to be mounted about such a rotating member and to be connected adjacent its ends to said member for rotation therewith, said sleeve including a central portion adapted to be free for movement with respect to said rotating member when mounted thereon, and a plurality of linkage arms each connected between adjacent one of said ends and said central portions so that twisting of said member due to torque causes axial movement of said central portion with respect to said ends, the geometry and position of each of said linkage arms being such that significant mechanical amplification is provided between the twisting movement of said rotating member in response to torque and the axial movement of said central portion in response to said twisting movement; and means for responding to said axial movement to provide an indication of the magnitude thereof.

11. The transducer of claim 10 wherein each of said linkage arms are formed by a plurality of axially stepped slotted openings, each of said openings having a first circumferentially extending portion adjacent one of said ends and a second circumferentially extending portion adjacent said central portion, and an axially extending connecting portion.

12. The transducer of claim 11 wherein each of said linkage arms are adapted to respond to twisting of said rotating member to pivot along a line at an angle with respect to a line perpendicular to the axis of rotation of said member of substantially less than 45°.

13. The transducer of claim 10 wherein each of said linkage arms are adapted to respond to twisting of said rotating member to pivot along a line at an angle with respect to a line perpendicular to the axis of rotation of said member of substantially less than 45°.

14. The transducer of claim 13 wherein said central portion further includes a conductive flange of low magnetic permeability mounted thereon and said means for responding to said axial movement is a noncontacting sensing means adapted to be mounted adjacent to and spaced from said flange and adapted to be electrically coupled to said flange to provide an electrical signal that is responsive to relative axial movement between said flange and said ends of said sleeve and thus the torque on said rotating member.

15. The transducer of claim 14 wherein axial movement of said rotating member causes movement of said conductive flange towards said noncontacting sensing means, and further including follower means responsive to axial movement of said rotating member to cause said sensing means to move in a manner to maintain at least a minimum spacing between said flange and said sensing means during relatively large axial movements of the rotating member, while preventing contact between said flange and said sensing means.

16. The transducer of claim 10 wherein said sleeve is split longitudinally to provide two substantially identical sections for mounting on said rotating member, and further including means for connecting said sections together about said member.

* * * * *